United States Patent
Mullet

(10) Patent No.: US 12,205,263 B2
(45) Date of Patent: *Jan. 21, 2025

(54) ASSET-LEVEL VULNERABILITY AND MITIGATION

(71) Applicant: X Development LLC, Mountain View, CA (US)

(72) Inventor: Benjamin Goddard Mullet, Sierraville, CA (US)

(73) Assignee: X Development LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/535,597

(22) Filed: Dec. 11, 2023

(65) Prior Publication Data

US 2024/0104710 A1    Mar. 28, 2024

Related U.S. Application Data

(63) Continuation of application No. 17/158,585, filed on Jan. 26, 2021.

(51) Int. Cl.
*G06T 7/00* (2017.01)
*G06F 18/214* (2023.01)
(Continued)

(52) U.S. Cl.
CPC .......... *G06T 7/0002* (2013.01); *G06F 18/214* (2023.01); *G06N 20/00* (2019.01);
(Continued)

(58) Field of Classification Search
CPC ... G06T 7/0002; G06V 20/176; G06V 20/188
(Continued)

(56) References Cited

U.S. PATENT DOCUMENTS 10,650,469 B1    5/2020   Tofte et al.
11,900,580 B2 *  2/2024   Mullet ............... G06Q 10/0635
(Continued)

FOREIGN PATENT DOCUMENTS

JP    2019108798    7/2019
JP    2019537770    12/2019

OTHER PUBLICATIONS

Fs.usda.gov [online], "Public Fire Information Websites," available on or before May 31, 2020, via Internet Archive: Wayback Machine URL <http://web.archive.org/web/20200531011841/https://www.fs.usda.gov/science-technology/fire/information>, retrieved on Feb. 4, 2021, URL<https://www.fs.usda.gov/science-technology/fire/information>, 4 pages.

(Continued)

*Primary Examiner* — Ayodeji O Ayotunde
(74) *Attorney, Agent, or Firm* — Fish & Richardson P.C.

(57) ABSTRACT

Methods, systems, and apparatus for receiving a request for a damage propensity score for a parcel, receiving imaging data for the parcel, wherein the imaging data comprises street-view imaging data of the parcel, extracting, by a machine-learned model including multiple classifiers, characteristics of vulnerability features for the parcel from the imaging data, determining, by the machine-learned model and from the characteristics of the vulnerability features, a damage propensity score for the parcel, and providing a representation of the damage propensity score for display.

19 Claims, 7 Drawing Sheets

(51) Int. Cl.
    *G06N 20/00*     (2019.01)
    *G06Q 50/16*     (2012.01)
    *G06V 20/10*     (2022.01)
    *G06Q 30/02*     (2023.01)
    *G06Q 40/08*     (2012.01)
    *G06Q 50/26*     (2012.01)

(52) U.S. Cl.
CPC .......... *G06Q 50/16* (2013.01); *G06V 20/176* (2022.01); *G06V 20/188* (2022.01); *G06Q 30/0278* (2013.01); *G06Q 40/08* (2013.01); *G06Q 50/26* (2013.01); *G06T 2207/20081* (2013.01); *G06T 2207/30188* (2013.01)

(58) Field of Classification Search
USPC .......................................................... 382/159
See application file for complete search history.

(56) References Cited

U.S. PATENT DOCUMENTS

| | | |
|---|---|---|
| 2014/0132409 A1 | 5/2014 | Billman et al. |
| 2020/0051242 A1 | 2/2020 | Stanley |
| 2020/0242360 A1 | 7/2020 | Alexander |
| 2022/0237764 A1 | 7/2022 | Mullet |

OTHER PUBLICATIONS

Fsapps.nwcg.gov [online], "Active Fire Mapping Program," available on or before Dec. 12, 2020, via Internet Archive: Wayback Machine URL <https://web.archive.org/web/20161222030545/https://fsapps.nwcg.gov/afm/>, retrieved on Feb. 4, 2021, URL <https://fsapps.nwcg.gov/afm/>, 1 page.

International Preliminary Report on Patentability in International Appln. No. PCT/US2021/062530, dated Aug. 10, 2023, 8 pages.

International Search Report and Written Opinion in International Appln. No. PCT/US2021/062530, dated Feb. 24, 2022, 13 pages.

Office Action in European Appln. No. 21214360.6, dated Mar. 14, 2022, 7 pages.

Zesty.ai [online], "Property Insights," available on or before Nov. 24, 2020, via Internet Archive: Wayback Machine URL <https://web.archive.org/web/20201124062831/https://www.zesty.ai/property-insights>, retrieved on Feb. 4, 2021, URL <https://www.zesty.ai/property-insights>, 7 pages.

Office Action in Australian Appln. No. 2021422849, dated Jun. 13, 2024, 4 pages.

Office Action in Japanese Appln. No. 2023-543370, dated Jun. 21, 2024, 10 pages.

\* cited by examiner

ASSET-LEVEL VULNERABILITY AND MITIGATION

CROSS-REFERENCE TO RELAYED APPLICATIONS

This application is a continuation application of, and claims priority to, U.S. patent application Ser. No. 17/158,585, filed on Jan. 26, 2021. The disclosure of the foregoing application is incorporated herein by reference in its entirety for all purposes.

BACKGROUND

Wildfires are increasingly problematic as land development encroaches into the wildland-urban interface and environmental changes result in extended periods of drought. Insurance providers and risk-assessment managers look at various assets present on a parcel and generate wildfire risk assessments using a regression approach and known vulnerabilities. Generating a risk assessment for a parcel can require property inspections and other one-time static appraisals, such that changes to the parcel can create a need for costly, updated re-evaluations to stay aware of current risk.

SUMMARY

This specification describes systems, methods, devices, and other techniques relating to utilizing machine-learning to gain insights about hazard vulnerability of a parcel/property from imaging data capturing the parcel/property.

In general, one innovative aspect of the subject matter described in this specification can be embodied in methods for receiving a request for a damage propensity score for a parcel, receiving imaging data for the parcel, where the imaging data comprises street-view imaging data of the parcel. A machine-learned model including multiple classifiers extracts characteristics of multiple vulnerability features for the parcel from the imaging data and determines, from the characteristics of the plurality of vulnerability features, the damage propensity score for the parcel. A representation of the damage propensity score is provided for display.

These and other implementations can each optionally include one or more of the following features. In some embodiments, the methods further include generating, from the characteristics of the multiple vulnerability features, a set of parcel of characteristics.

In some embodiments, the methods further include generating, from the characteristics of the multiple vulnerability features and imaging data for the parcel, a three-dimensional model of the parcel.

In some embodiments, imaging data for the parcel includes imaging data captured within a threshold of time from a time of the request.

In some embodiments, receiving the request for the damage propensity score includes receiving hazard event data for a hazard event, and determining, from the characteristics of the multiple vulnerability features and the hazard event data for the hazard event, the damage propensity score for the parcel for the hazard event. The methods can further include receiving, updated hazard event data for the hazard event, and determining, from the characteristics of the multiple vulnerability features, the hazard event data, and the updated hazard event data, an updated damage propensity score for the parcel for the hazard event.

In some embodiments, the methods further include determining, by the machine-learned model and for the parcel, one or more mitigation steps, determining, by the machine-learned model and based on the one or more mitigation steps, an updated damage propensity score, and providing a representation of the one or more mitigation steps and the updated damage propensity score. The one or more mitigation steps can include adjustments to the characteristics of the multiple vulnerability features extracted from the imaging data.

In some embodiments, determining one or more mitigation steps further includes iterating a updated damage propensity score determination based on adjusted characteristics of the multiple vulnerability features. In some embodiments, determining the updated damage propensity score further includes determining that the updated damage propensity score meets a threshold damage propensity score.

In some embodiments, determining the one or more mitigation steps includes determining for a particular type of hazard event, the one or more mitigation steps, where one or more mitigation steps for a first type of hazard event is different than one or more mitigation steps for a second type of hazard event.

In some embodiments, the methods further include generating training data for the machine-learned model, including receiving, for a hazard event, multiple parcels located within a proximity of the hazard event, where each parcel of the multiple parcels received at least a threshold exposure to the hazard event, receiving, for each parcel of the multiple parcels, imaging data for the parcel, where the imaging data comprises street-view imaging data, and extracting, from the imaging data, characteristics of multiple vulnerability features for a first subset of parcels of the multiple parcels that did not burn and for a second subset of parcels of the multiple parcels that did burn during the hazard event, and providing, to a machine-learned model, the training data.

In some embodiments, extracting characteristics of the multiple vulnerability features includes, providing the imaging data to the plurality of classifiers. Extracting characteristics of the plurality of vulnerability features can include identifying, by the multiple classifiers, multiple objects in the imaging data.

In some embodiments, the methods further include receiving, for each parcel of the multiple parcels, additional structural characteristics, extracting, from the additional structural characteristics, a second set of multiple vulnerability features for the first subset of parcels of the multiple parcels that did not burn and for the second subset of parcels of the multiple parcels that did burn during the hazard event, and providing, to the machine-learned model, the second set of multiple vulnerability features.

In some embodiments, the additional structural characteristics include post-hazard event inspections of the multiple parcels.

The present disclosure also provides a non-transitory computer-readable storage medium coupled to one or more processors and having instructions stored thereon which, when executed by the one or more processors, cause the one or more processors to perform operations in accordance with implementations of the methods provided herein.

It is appreciated that the methods and systems in accordance with the present disclosure can include any combination of the aspects and features described herein. That is, methods and systems in accordance with the present disclosure are not limited to the combinations of aspects and features specifically described herein, but also include any combination of the aspects and features provided.

Particular embodiments of the subject matter described in this specification can be implemented so as to realize one or more of the following advantages. An advantage of this technology is that a novel understanding of hazard vulnerability can be developed for a substantially larger number of vulnerability features over traditional methods using a trained machine-learning model that considers a composition of characteristics of vulnerability features in response to a particular set of hazard conditions and degree of exposure, and which may be more complex than a summation of risk factors and can reflect non-obvious features that contribute towards the degree of incurred damage or a damage/no-damage result. An assessment of the hazard vulnerability for a particular hazard and degree of exposure can be determined for a parcel using imaging data and may not require additional property inspections. Hazard vulnerability assessments can be utilized in determining property valuation, sale, taxes, and the like.

Utilizing street-view imagery of a parcel can result in access to unique features of a parcel that are not otherwise available using other imaging data, for example, features that reflect a current state of a home on a parcel (e.g., vines growing on a side of the house, location of cars parked in a driveway). A vulnerability propensity score can be determined under real-time hazard conditions where a mitigation response can be updated as the hazard conditions change, for example, to identify vulnerable parcels based on each parcels' respective vulnerability under current conditions of the hazard event. Optimized mitigation steps, e.g., a risk reduction plan and/or cost-benefit estimate, can be determined in an iterative process by the trained machine learned model based on the extracted characteristics of vulnerability features for a parcel and in response to a hazard event.

Applications for this technology generally include insurance risk assessment, real-time risk assessment and response, and generally natural disaster hazard assessment and mitigation. More specifically, this technology can be utilized by municipal, state, or national governments to more accurately conduct risk assessments and design and enact risk mitigation plans.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

Figure 1:
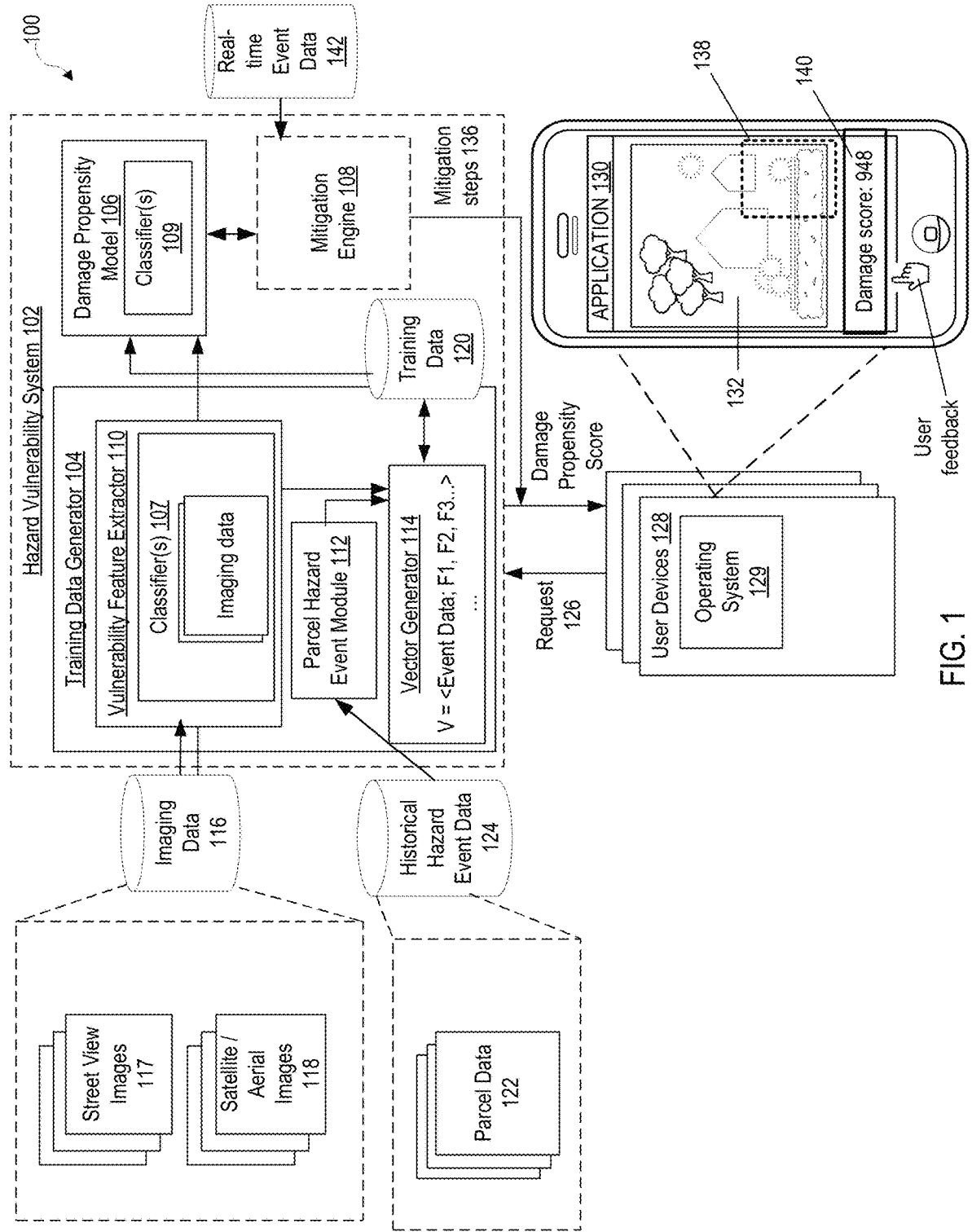
FIG. 1 is a block diagram of an example operating environment of a hazard vulnerability system 102.

The technology of this patent application is directed towards utilizing machine-learning to gain insights about hazard vulnerability of a parcel/property from imaging data capturing the parcel/property.

More particularly, the technology of this application utilizes a trained machine-learned model to identify vulnerability features and identify characteristics of the vulnerability features within imaging data of a parcel, e.g., street-view imaging data, LIDAR data, high-resolution satellite image data, aerial image data, infrared image data, user-provided images, etc. The characteristics of vulnerability features can be utilized to generate a vulnerability propensity score and/or identify mitigation strategies for reducing hazard vulnerability for a particular parcel in response to a particular hazard and degree of exposure.

Generating training data for training a machine-learned model can include selecting a set of parcels that are located within a proximity of a hazard event, e.g., within a radius of a burn scar. A hazard event can be, for example, a wildfire, flood, tornado, etc., where the set of parcels each experience a degree of exposure to the hazard event. For each parcel of the set of parcels, imaging data capturing the parcel prior to the hazard event is collected, e.g., photos of homes/properties prior to experiencing a wildfire.

Vulnerability features of a parcel can be defined using existing risk assessment data, e.g., defensible space, building construction, or other features that are known to be associated with increasing/decreasing hazard vulnerability. Vulnerability features can be additionally extracted from imaging data depicting parcels that have damage/no-damage results and/or degree of damage results for a particular hazard event, where one or more neural networks can be utilized to process the imaging data and extract the additional vulnerability features that are determined to distinguish a parcel's damage/no-damage result and/or degree of damage result.

Characteristics of the vulnerability features, e.g., a material of roof construction, a distance between a tree and a home, manufacturing information for building materials, frontage, fencing types, irrigation, etc., can be extracted from the imaging data of the parcel using multiple classifiers and utilizing object recognition techniques. Training data can be generated for multiple sets of parcels and for respective hazard events and can include the extracted characteristics of the vulnerability features, a location of a parcel relative to the hazard event, degree of exposure/damage during a hazard event, and damage/no-damage results. Additionally, public records for the parcel, information about the hazard event, and the like can be utilized in generating the training data for training the machine-learned model.

The trained machine-learned model can receive a request for a vulnerability assessment for a particular parcel and for a hazard event including a degree of exposure. Imaging data can be collected for the parcel, e.g., using a known address, geolocation, etc., of the parcel, and can include only imaging data that is captured within a threshold of time, e.g., collected within the previous six months. Imaging data can reflect a current condition of the parcel, e.g., a current state of the vegetation surrounding the parcel, location of vehicles, structures erected within the parcel (e.g., a shed), or the like. The machine-learned model can receive the imaging data, public records (e.g., construction year, set back, variance, etc.), and other relevant geospatial information (e.g., neighborhood housing density, distances to fire stations/emergency services, distances to major roads, etc.) as input and extract characteristics for vulnerability features for the parcel. A determined vulnerability propensity score can be provided as output.

In some embodiments, the model can determine, based on the vulnerability features of the parcel, mitigation steps to reduce a risk score for the parcel. Determining mitigation steps by the machine-learned model can include identifying characteristics of vulnerability features that can be adjusted, e.g., cutting back overgrowth, changing a roofing material, changing a siding material, and iterating a risk score determination based on adjusted characteristics of the vulnerability features. Permutations of mitigation steps can be evaluated for various hazard event scenarios to provide an optimized subset of mitigation steps for a particular parcel.

In some embodiments, real-time hazard vulnerability can be determined for a particular parcel based on a real-time hazard event or a potential future hazard risk, e.g., a wildfire in progress, a drought occurrence, a severe weather pattern, etc. As the hazard event evolves, e.g., changes in a degree of exposure, the hazard vulnerability of the parcel can be updated and real-time alerts generated in response, e.g., notifying a homeowner or emergency responder of a real-time hazard vulnerability and/or countermeasures.

Example Operating Environment

FIG. 1 is a block diagram of an example operating environment 100 of hazard vulnerability system 102. Hazard vulnerability system 102 can be hosted on one or more local servers, a cloud-based service, or a combination thereof.

Hazard vulnerability system 102 can be in data communication with a network, where the network can be configured to enable exchange of electronic communication between devices connected to the network. The network may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. The network may include multiple networks or subnetworks, each of which may include, for example, a wired or wireless data pathway. The network may include a circuit-switched network, a packet-switched data network, or any other network able to carry electronic communications (e.g., data or voice communications). For example, the network may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network may include one or more networks that include wireless data channels and wireless voice channels. The network may be a wireless network, a broadband network, or a combination of networks including a wireless network and a broadband network.

The hazard vulnerability system 102 includes a training data generator 104 and damage propensity model 106. Optionally, the hazard vulnerability system 102 includes a mitigation engine 108. Though described herein with reference to a training data generator 104, damage propensity model 106, and mitigation engine 108, the operations described can be performed by more or fewer sub-components.

The training data generator 104 includes a vulnerability feature extractor 110, a parcel hazard event module 112, and a vector generator 114. The training data generator 104 receives imaging data 116 from a repository of satellite and/or aerial images 118, street-view images 117, etc., and provides training data 120 as output. The output training data 120 can be utilized to train the damage propensity model 106.

Damage propensity model 106 includes multiple classifiers 107, for example, one or more neural networks or machine-learned models, e.g., random forest. Classifiers can be configured to classify damage propensity as a binary outcome, e.g., damage or no damage, or can be configured to classify a degree of damage propensity, e.g., using a regression task. In some embodiments, classifiers can be utilized to estimate damage to particular sub-components of a parcel, e.g., a roof of a building, siding of a building, or the like, to further refine the damage propensity model 106.

The damage propensity model 106 can receive training data 120 including a substantial number of training vectors generated using a large sample of different hazard events documented with imaging data 116 and historical hazard event data 124. Damage propensity model 106 can be trained to make inferences about a damage propensity of a particular parcel based in part on characteristics of vulnerability features for the parcel. Multiple classifiers 109, e.g., including a same set of classifiers as described with reference to classifiers 107 or different, can process received imaging data 116 to identify and label characteristics of vulnerability features extracted from imaging data 116.

Satellite/aerial images 118 include any images capturing a geographical region and providing information for the geographical region. Information for the geographical region can include, for example, information about one or more parcels located in the geographical region, e.g., structures, vegetation, terrain, etc. Satellite/aerial images can be, for example, Landsat images, or other forms of aerial imagery. The satellite/aerial images 118 can be, for example, RGB images or hyperspectral images. Satellite/aerial images 118 can be captured using satellite technology, e.g., Landsat, or drone technology. In some implementations, satellite/aerial images can be captured using other high-altitude technology, e.g., drones, weather balloons, planes, etc. In some embodiments, synthetic aperture radar (SAR) images can be utilized in addition to the satellite images as described herein.

In some implementations, satellite images or other aerial imagery may be captured utilizing radar-based imaging, for example, LIDAR images, RADAR images, or another type of imaging using the electromagnetic spectrum, or a combination thereof. Satellite/aerial images 118 can include images of geographic regions including various natural features including different terrains, vegetation, bodies of water, and other features. Satellite/aerial images 118 can include images of man-made developments, e.g., housing construction, roads, dams, retaining walls, etc.

Street-view images 117 include any images capturing an aspect of one or more parcels from a frontage perspective, e.g., captured from a road or sidewalk facing the parcel. In some embodiments, street-view images 117 can be captured by one or more cameras affixed to a vehicle and configured to capture street-view images 117 of parcels as the vehicle drives past the parcels. Optical and LIDAR street-view images 117 can be utilized to capture depth information about parcels. In some embodiments, street-view images 117 can have high spatial resolution, for example, street view images can have a spatial resolution that is less than 1 centimeter.

In some embodiments, street-view images 117 can be captured by a user, e.g., a homeowner of a parcel, from a frontage view of a property. Street-view images can be captured using a built-in camera on a smart device, e.g., smart phone or tablet, and/or can be captured using a handheld camera. In some embodiments, street-view images can be captured by a land-surveyor, insurance assessor, parcel appraiser, or other person documenting an aspect of the parcel.

In some embodiments, street-view images 117 can include additional views of parcels, e.g., views captured from a side of a parcel, back of a parcel. For example, a user can capture street-view images 117 of a backyard of their property, or a side-view of their property.

In some embodiments, imaging data 116 can include images of parcels before and after hazard events, e.g., before and after a wildfire. Imaging data 116 associated with a particular hazard event can include a burn scar, e.g., an area damaged by the hazard event. Further discussion of imaging data 116 is presented with reference to FIGS. 2A-2C.

The training data generator 104 receives parcel data 122 from a repository of historical hazard event data 124. Parcel data 122 can include, for example, insurance assessments, land surveys, appraisals, building/construction records, code inspections/violations, and other public records.

In some embodiments, parcel data 122 includes public records from post-hazard event damage reports, for example, from a Damage Inspection (DINS) database maintained by CalFIRE, from post-hazard insurance inspections, and the like. Post-hazard event damage reports can include in person inspections of structures exposed to hazard events, e.g., wildfires, and can include information on structure vulnerability characteristics, e.g., roof type, eave type, construction materials, etc., as well as damage level. The parcel data 122 can include damage/no-damage data and/or degree of damage data for hazard events for parcels that are within a radius of the hazard event, e.g., within a radius of the burn radius.

Training data generator 104 receives imaging data 116 as input. Imaging data 116 captures one or more parcels at a particular location, e.g., one or more homes, and at a particular point in time, e.g., before a hazard event or after a hazard event. For example, a street-view image 117 can capture a home at a particular street address and a first date/time, e.g., before a hazard event.

Vulnerability feature extractor 110 can include multiple classifiers 107, where the multiple classifiers can identify vulnerability features, e.g., objects, within the imagining data 116. For each parcel depicted in the imaging data 116, the vulnerability feature extractor 110 can extract vulnerability features and provide the vulnerability features F1, F2, . . . FN for the parcel as output to the vector generator module 114. Continuing the example above, vulnerability features F1, F2, . . . FN are extracted for the home at the particular street address and the first date/time, e.g., roof construction, vegetation, frontage distance, property slope, etc.

Vulnerability features can include, but are not limited to, building materials, defensible space, slope of the parcel, proximity to a road, and the like. Vulnerability features can additionally include objects, for example, trees, vehicles, and the like. In some embodiments, ground truth labeling can be utilized to identify vulnerability features, e.g., by a human expert or in an automatic/semi-automatic manner.

Vulnerability features utilized by insurance adjusters/risk-assessment managers can be identified in the imaging data 116.

Vulnerability features can additionally include vulnerability features of the parcels captured in the imaging data 116 that are not traditionally identified as risk-hazards by insurance adjusters/risk-assessment. In other words, features of the parcel that may not traditionally be labeled as hazard risks can be extracted as possible vulnerability features to generate training data. For example, driveway construction, distance between a parked car and the home, species of grass seed used in a lawn, etc. The damage propensity model 106 may define vulnerability features extracted from the imaging data 116 as being significant that otherwise may not be anticipated as being significant, e.g., by traditional means, such that vulnerability features can be processed by the machine-learned model to determine which of the possible vulnerability features have significance in the parcel's damage propensity, e.g., have a statistical effect on damage/no-damage outcome and/or degree of damage outcome. In this way, novel and non-obvious features can be identified as having significance on damage propensity.

Each vulnerability feature for a parcel is descriptive of an aspect of the parcel depicted within the imaging data 116, e.g., in the street-view images 117 and/or satellite/aerial images 118. For each vulnerability feature extracted from the imaging data 116, one or more characteristics C1, C2, . . . CN of the vulnerability feature are extracted, e.g., F1{C1, C2, . . . CN}. Further details of the feature extraction is discussed with reference to FIGS. 2A-2C. Characteristics of the vulnerability features can include quantifiable and/or qualifiable aspects of the vulnerability features. For example, a vulnerability feature that is a roof construction can be characterized by building material, shingle spacing, age of construction, and upkeep of the roof. In another example, a vulnerability feature that is a slope of the parcel can be characterized with a slope measurement of 0.5°.

Parcel hazard event module 112 receives, as input, historical hazard event data 124 including records of past hazard events and parcel data 122 for each parcel depicted in the imaging data 116 that is processed by the vulnerability feature extractor 110. Parcel hazard event module 112 provides parcel data 122 for the parcel to the vector generator 114.

Historical hazard event data 124 can include times of the hazard event, e.g., a start time of the hazard event and an end time. For example, a start time when a wildfire began and an end time when the wildfire is fully contained or fully extinguished. Historical hazard event data 124 can include a geolocation, e.g., GPS coordinates, of an affected area affected by the hazard event, e.g., the area including the burn scar.

Parcel data 122 for a particular parcel can include public records for the parcel before and after a hazard event, e.g., before and after a wildfire. For example, parcel data 122 can include post-hazard insurance/appraisal records, e.g., damage assessment from after the hazard event. In other words, parcel data 122 can include damage/no-damage results, e.g., damaged vs not damaged, for a parcel for a particular hazard event. The parcel hazard event module 112 can utilize the damage/no-damage results and/or degree of damage results for multiple parcels located within a burn radius 208 of a hazard event as ground truth for the training data 120.

In some embodiments, parcel data 122 for a home can include structural characteristics for the parcel, e.g., build records, construction materials, roof type, etc., collected before a hazard event.

Training data generator 104 can generate training data from images of parcels using imagining data 116 occurring before and after a hazard event and from parcel data 122 for the parcels from the historical hazard event data 124 corresponding to the event, e.g., before and after a wildfire. The vulnerability feature extractor 110 can extract vulnerability features and associated characteristics for parcels in the imaging data 116 that each appear within a radius of the hazard event, e.g., within a distance of the burn scar.

Vector generator 114 receives extracted vulnerability features and characteristics of the vulnerability features from the feature extraction module 110 and optionally parcel data 122 from the parcel hazard event module 112 for a particular parcel as input. In some embodiments, parcel data 122 can be used as ground truth in the training data 120, for example, parcel data 122 including a damage/no-damage outcome and/or degree of damage outcome for a hazard event can be used to label the parcel as either "burn" or "no-burn."

Vector generator 114 can generate training data 120 from the extracted vulnerability features, characteristics of the vulnerability features, and the parcel data 122 for each parcel, e.g., respective training vectors V. Further details of the generation of training data is discussed with reference to FIG. 4.

Damage propensity model 106 can receive training data 120 as input to train the machine-learned model, e.g., damage propensity model 106, using the training data 120. In some implementations, damage propensity model 106 can be trained using a substantial number of training vectors generated using a large sample of different locations and parcel data representative of various historical hazard events. In one example, many thousands of parcels subject to many different hazard events can be included in the training data 120 provided to the damage propensity model 106.

Hazard vulnerability system 102 receives a request 126 from a user of a user device 128. User device 128 can include, for example, a mobile phone, tablet, computer, or another device including an operating system 129 and an application environment 130 through which a user can interact with the hazard vulnerability system 102. In one example, user device 128 is a mobile phone including application environment 130 configured to display a view 132 including at least a portion of a parcel. In one example, as depicted in FIG. 1, the application environment 130 displays a view 132 including a street-view of a home and surrounding property, e.g., trees, bushes, shrubbery, etc.

Request 126 can include a location of a parcel specified by a user of the user device 128. The location of the parcel can include a geolocation, e.g., GPS coordinates, street address, etc., and can be input by the user into the application environment 130.

Request 126 can further include a request for a damage propensity score, e.g., a relative vulnerability to hazard event, where the request 126 can specify a particular hazard event, e.g., a particular real-time hazard event or specify a general type of hazard events, e.g., wildfire, flood, earthquake, etc. In one example, a user can submit a request 126 specifying a street address of a parcel and request a damage propensity score for that parcel for a real-time hazard event, e.g., an occurring wildfire. In another example, a user can submit a request 126 specifying a location of parcel including GPS coordinates and request a flood-specific damage propensity score for the parcel.

In some embodiments, a damage propensity score can be a relative measure of risk for a particular parcel to be damaged by a hazard event. The damage propensity score can be a general measure of risk to the particular parcel to be damaged by a type of hazard event, e.g., a wildfire, or can be a specific measure of risk to the particular parcel to be damaged by a particular hazard event, e.g., a real-time flooding event.

In some embodiments, a damage propensity score can include a percent loss, e.g., a percent damage, for a given parcel under a particular hazard scenario. For example, a damage propensity score can be 10% loss for a particular parcel under a particular wildfire scenario.

In some embodiments, an end-user, e.g., property owner, insurance assessor, government official, etc., can provide a complete probabilistic hazard model, i.e., a distribution of hazard characteristics and associated probabilities, such that the hazard vulnerability system can provide an expected average annual loss (AAL) for a particular parcel.

In some embodiments, request 126 can specify a location including multiple parcels, e.g., a neighborhood, street including multiple homes, a complex including multiple buildings, etc. A user may be interested in determining individual damage propensity scores for each structure in a location including multiple parcels, or may be interested in determining a global damage propensity score for the multiple parcels.

In some embodiments, the hazard vulnerability system 102 receives as input a request 126 including a request for mitigation steps to reduce a hazard vulnerability of a parcel. Mitigation engine 108 can receive the request for mitigation steps and identify, based on the imaging data 116 and damage propensity score 140, a set of mitigation steps 136 that the user can take to reduce the hazard vulnerability of the parcel. Mitigation steps are quantifiable and/or quantifiable measures that can be taken by a user, e.g., homeowner, to reduce damage propensity score 140. Mitigation steps can include, for example, removal/reduction of vegetation in proximity to a structure, construction materials to use for the structure, and the like. For example, a mitigation step can be to cut back foliage within a 2 foot radius surrounding a home. In another example, a mitigation step can be changing a siding material on the home. In yet another example, a mitigation step can be digging an irrigation ditch to collect run-off from a flooded creek area.

In some embodiments, mitigation steps can be provided in the application environment 130 on the user device 128, where the mitigation steps 136 are visually identified, e.g., an indicator overlaid on an view 132 of the parcel. For example, a tree with branches over-hanging a roof can be visually identified, e.g., with a box surrounding the tree and/or branches, in the application environment.

In some embodiments, mitigation engine 108 can receive real-time event data 142, e.g., real-time data for an occurring hazard event, and update the mitigation steps 136 in real-time to provide the user with real-time response to a hazard event. Real-time event data 142 can include, for example, hazard spread, weather patterns, mitigating events, emergency response, etc. For example, real-time event data 142 for a wildfire can include a real-time perimeter of the fire, percentages of control by fire fighters, evacuation data, wind advisories, etc. In another example, real-time event data 142 for a flood can include real-time river/creek levels, flooding levels, rain/weather forecast, evacuation data, etc.

Feature Extraction

Figure 2A:
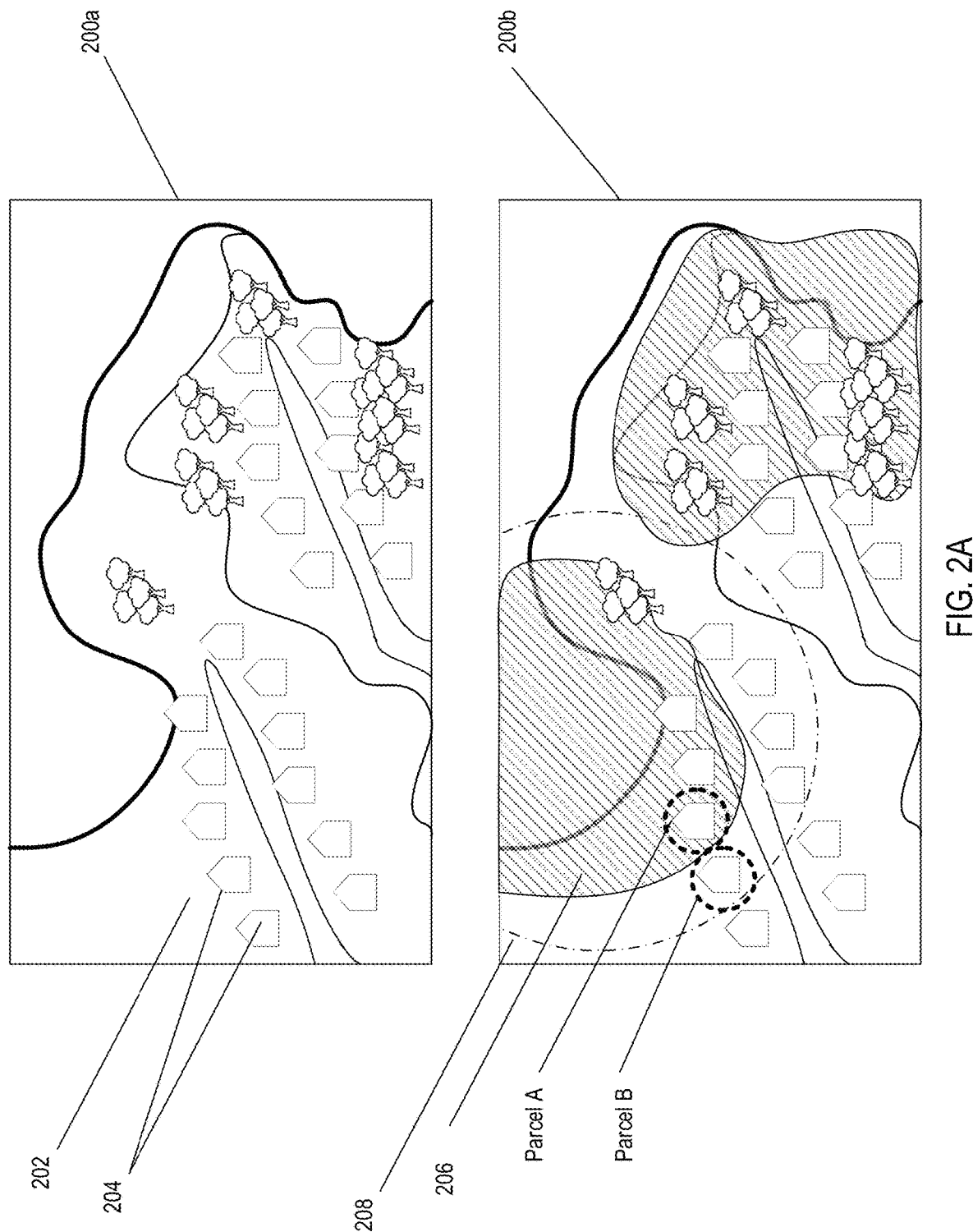
FIG. 2A depicts satellite/aerial-based images including multiple example parcels before and after a hazard event.

As discussed above with reference to FIG. 1, vulnerability feature extractor 110 can receive imaging data 116 including satellite/aerial images 118, and street-view images 117 as input and extraction vulnerability features with associated characteristics. FIG. 2A is a schematic of an example pair of satellite images including multiple parcels before and after a hazard event. Satellite images 200a and 200b are captured at capture times T1 and T2, respectively, where T1 is a time occurring before a hazard event and T2 is a time occurring after the hazard event. Additionally, T1 and T2 can be selected based on parcel data 122 for a parcel included in the satellite images 200a, 200b, where the parcel data includes records for the parcel at a time T1' before the hazard event and a time T2' after the hazard event.

Satellite images 200a and 200b depict the same geographic region 202 including a set of parcels 204. Satellite image 200a is captured at time T1 occurring within a first threshold of time before the initiation of the hazard event and satellite image 200b is captured at time T2 occurring within a second threshold of time after the termination of the hazard event.

Satellite image 200b, captured after the hazard event, includes a burn scar 206 resulting from the hazard event, e.g., a fire. Burn scar 206 can indicate areas of the geographic region 202 that were damaged/affected by the hazard event. A burn radius 208 encompasses the burn scar 206 and defines a perimeter surrounding the burn scar 206 and including additional area buffering the burn scar. Burn radius 208 can include an additional radius extending outward from the burn scar, e.g., an additional 100 feet, additional 1000 feet, and additional 5000 feet. Burn radius 208 can include a parcel A that has been damaged/affected by the hazard event and a parcel B that has not been damaged/affected by the hazard event. Parcel A can be a parcel located within the burn scar 206 and was damaged/affected by the hazard event. Parcel B can be parcel located outside the burn scar 206 but within the burn radius 208, or parcel B can be a parcel located within the burn scar 206 but that has not been damaged/affected by the hazard event.

Satellite image 200b captured after the hazard event can include multiple burn scars 206 and burn radii, where the burn scars and/or burn radii may overlap with each other. Parcels can be located in an overlap region of burn scars and/or overlap region of burn radii.

As described with reference to FIG. 1, vulnerability feature extractor 110 receives satellite images 200a, 200b and extracts vulnerability features F1, F2, . . . FN from the images 200a, 200b and respective characteristics of the vulnerability features. Vulnerability features extracted from the satellite images 200a, 200b can include, for example, roof constructions, location of parcels relative to natural formations, e.g., forest/tree coverage, waterways, etc., location of parcels relative to man-made features, e.g., roadways, irrigation ditches, farmland, etc., and the like. Respective characteristics can include, for example, building materials for the roof construction, e.g., ceramic, metal, wood, etc. In another example, characteristics for locations of parcels relative to man-made features can include relative distances between the parcels and the man-made features, e.g., distance of the house to the street.

In some embodiments, vulnerability features can be extracted from the satellite images 118 for multiple parcels appearing within the satellite images. Additional vulnerability features can be extracted for each of the parcels of the multiple parcels using higher-resolution images, e.g., using street-view images 117.

Figure 2B:
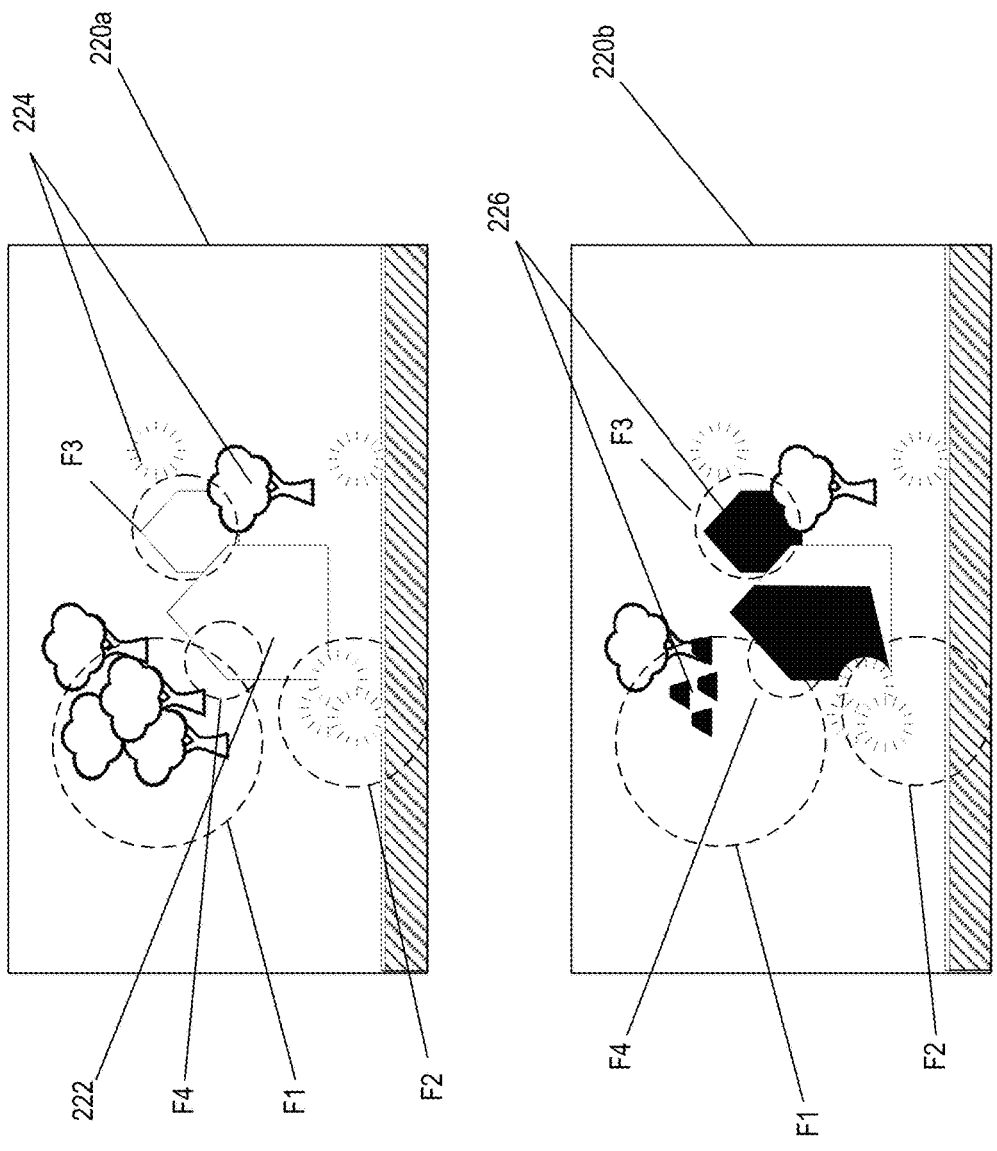
FIG. 2B depicts street-view-based images of an example parcel before and after a hazard event.

FIG. 2B is a schematic of an example pair of street-view images of parcel A captured before and after the hazard event. Street-view images 220a and 220b depict a street-view, e.g., captured from street-level and facing the parcel, of a house 222 and surrounding vegetation 224 located on the parcel A. Street-view image 220b captured after the hazard event includes hazard event damage 226, e.g., to the house, adjacent storage shed, and to nearby trees.

Vulnerability features are extracted from the street-view images 220a, 220b. As discussed with reference to FIG. 1, vulnerability feature extractor 110 receives imaging data 116 including street-view images 117, e.g., images 220a, 220b, and extracts vulnerability features F1, F2, . . . FN. Referring back to FIG. 2B, vulnerability features extracted from the street-view images 220a, 220b include a group of trees (F1), a group of bushes (F2), an outdoor shed (F3), and a roof construction of house 222 (F4). More or fewer vulnerability features can be extracted from street-view images 220a, 220b, and the examples provided are not to be limiting.

For each of the vulnerability features extracted from the street-view images 220a, 220b, the vulnerability feature extractor identifies characteristics of the respective vulnerability features. For example, the group of trees F1 can have associated quantifiable characteristics, e.g., distance of the trees to the house 222, number of trees, height of trees, closeness of clustering of the trees, etc., and qualifiable characteristics, e.g., health of the trees, ivy-covering, etc. In another example, roof construction F4 can have associated characteristics, e.g., building materials, eaves construction, slant of roof, age of roof, upkeep of roof, fullness of gutters, etc.

In some embodiments, vulnerability feature extractor 110 can identify vulnerability features for the parcel A, e.g., street-view image 220b, that reflect damage from the hazard event. In other words, the vulnerability feature extractor 110 can note the vulnerability features whose characteristics reflect damage as result of the hazard event, e.g., roof construction that indicates burn/smoke damage, trees that have been burned, etc.

Figure 2C:
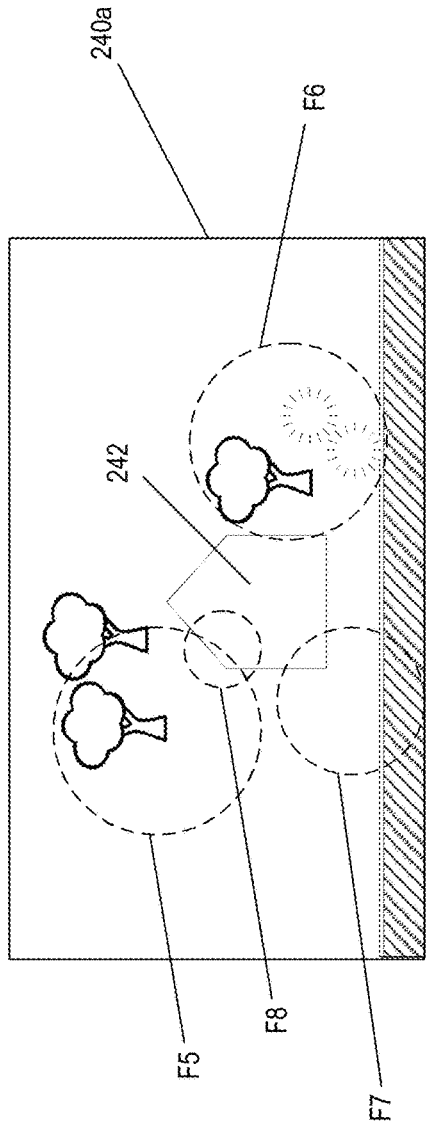
FIG. 2C depicts street-view-based images of another example parcel before and after a hazard event.
Figure 2C:
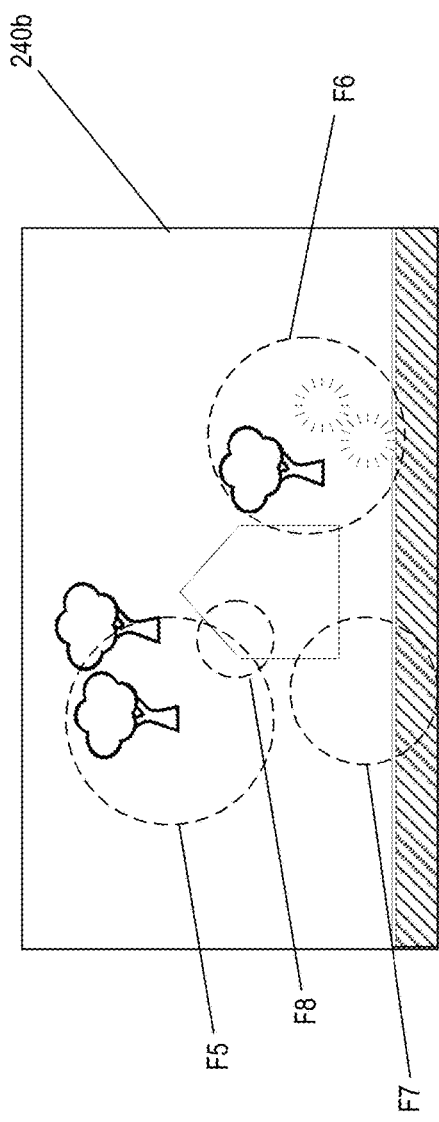

FIG. 2C is a schematic of an example pair of street-view images of parcel B captured before and after the hazard event. Street-view images 240a and 240b depict a street-view, e.g., captured from street-level and facing the parcel, of a house 242 and surrounding vegetation 224 located on the parcel B depicted outside the burn scar 206 and within the burn radius 208 for the hazard event. Unlike the parcel A described with reference to FIG. 2B, parcel B in FIG. 2C is depicted as not having sustained damage from the hazard event.

Similarly, as described with reference to FIG. 2B, vulnerability features extracted from the street-view images 240a, 240b include a group of trees (F5), a group of bushes (F6), frontage space between the house and the street (F7), and a roof construction of home 246 (F8). More or fewer vulnerability features can be extracted from street-view images 240a, 240b, and the examples provided are not to be limiting.

For each of the vulnerability features extracted from the street-view images 240a, 240b, the vulnerability feature extractor identifies characteristics of the respective vulnerability features. For example, the group of trees F5 can have associated quantifiable characteristics, e.g., distance of the trees to the house 242, number of trees, height of trees, closeness of clustering of the trees, etc., and qualifiable characteristics, e.g., health of the trees, ivy-covering, etc. In another example, frontage space between the house and the street F7 can have characteristics including, for example, a distance, a slope, type of ground cover (e.g., cement vs grass), etc.

Vulnerability feature extractor 110 provides extracted vulnerability features and characteristics from imaging data 216, e.g., 200a, 200b, 220a, 220b, 240a, 240b, to the vector generator 114 to generate training data 120.

Example Processes

Figure 3:
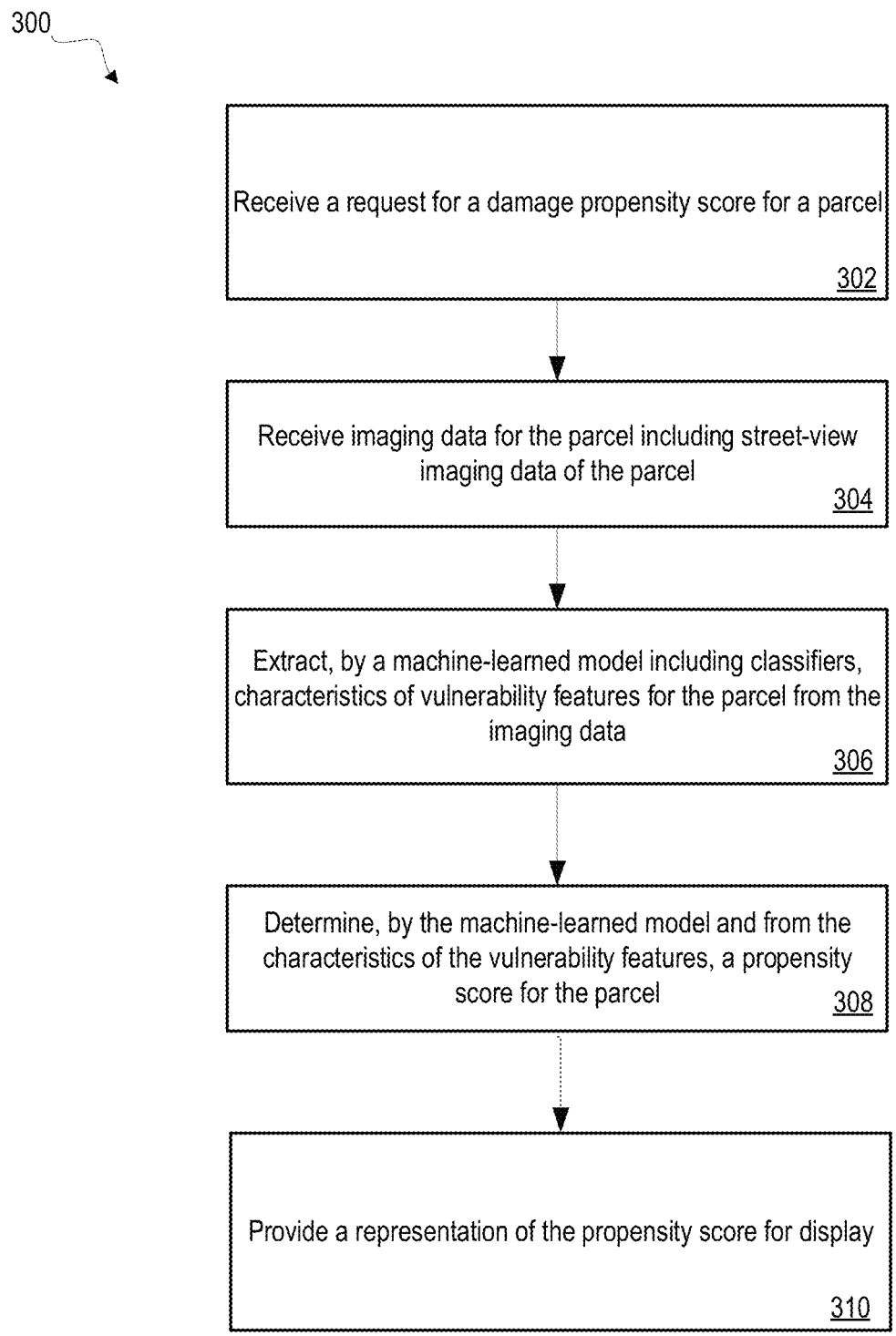
FIG. 3 is a flow diagram of an example process of the hazard vulnerability system.

FIG. 3 is a flow diagram of an example process of the hazard vulnerability system 102. The system 102 receives a request for a damage propensity score for a parcel (302). A request 126 can be provided to the hazard vulnerability system 102 by a user through a graphical user interface of the application environment 130. The request 126 can include a request for a damage propensity score 140 for a particular parcel and can additionally include a request for one or more mitigation steps 136 for reducing the damage propensity score 140. The request 126 can further specify a particular hazard event, e.g., an on-going wildfire, or a general hazard event type, e.g., flooding, and request the damage propensity score in response.

The system receives imaging data for the parcel including street-view imaging data of the parcel (304). The hazard vulnerability system 102 can receive imaging data 116 including street-view images 117 from a repository of imaging data. Each image can include the particular specified parcel of interest to the user. In some embodiments, the user can capture additional street-view images of the parcel with a camera, e.g., built-in camera of the user device 128, and upload them to the hazard vulnerability system 102.

In some embodiments, the system receives imaging data for the parcel that is captured within a threshold amount of time from the time of the request 126, e.g., within six months, within 2 weeks, within 1 hour, etc.

A machine-learned model including classifiers extracts characteristics of vulnerability features for the parcel from the imaging data (306). The damage propensity model 106 can receive the imaging data 116 and extract characteristics of vulnerability features using multiple classifiers 107. Vulnerability feature extractor 110 receives images of the parcel from the imaging data 116 and extracts vulnerability features F1, F2, . . . FN of the parcel and, for each vulnerability feature FN, the vulnerability feature extractor 110 extracts one or more characteristics C1, C2, . . . CN of the vulnerability feature FN. In one example, the vulnerability feature extractor 110 receives a street-view image of the parcel capturing the home and surrounding property and identifies, using multiple classifiers, vulnerability features including, for example, the home, vegetation, frontage area, fencing, and the like. Vulnerability feature extractor 110 identifies characteristics of each of the extracted vulnerability features, for example, building materials used for the home, e.g., siding type, roof type, eaves construction, etc.

The machine-learned model determines, from the characteristics of the vulnerability features, a propensity score for the parcel (308). The damage propensity model 106 is trained on training data 120, as described in further detail below with reference to FIG. 4, including multiple hazard events, e.g., hundreds of hazard events, and multiple parcels for each hazard event, e.g., thousands of parcels, such that the model 106 can make inferences between characteristics of vulnerability features for a parcel and a damage propensity of the parcel. The model 106 generates a damage propensity score 140 as output.

The system provides a representation of the propensity score for display (310). The damage propensity score 140 can be provided in the graphical user interface of application environment 130. The propensity score 140 can be represented visually, e.g., as a numerical value, and/or can be presented with contextual clues including, for example, a relative scale of hazard, color coding (high, medium, or low risk). Propensity score 140 can be presented with contextual information for the user to better understand a significance of the propensity score 140.

In some embodiments, the characteristics of the vulnerability features and imaging data for a parcel can be utilized by the hazard vulnerability system 102 to generate a three-dimensional model of the parcel. The three-dimensional model of the parcel can be displayed in the graphical user interface to assist a user in understanding the damage propensity score and/or one or more mitigation steps 136 for optimizing the damage propensity score.

In some embodiments, the hazard vulnerability system 102 can determine one or more mitigations steps 136 to provide to the user as ways to reduce risk, e.g., optimize a damage propensity score 140. Mitigation engine 108 can receive a damage propensity score and characteristics of the vulnerability features of the parcel, and determine one or more mitigation steps 136. Mitigation steps 136 can be identified by the damage propensity model 106, based on inference of what characteristics of vulnerability features reduce damage propensity. Mitigation steps 136 can include, for example, cutting back tree branches away from the home. In another example, mitigation steps 136 can include changing a roofing construction material, changing a location of an outdoor shed, clearing brush away from a frontage area of the home, and the like. Mitigation engine 108 can provide, to the damage propensity model 106, suggested updated characteristics of the vulnerability features. The damage propensity model 106 can receive the suggested updated characteristics of the vulnerability features and determine an updated damage propensity score 140.

In some embodiments, mitigation engine 108 can determine mitigation steps 136 by calculating a gradient of the damage propensity score 140 with respect to each vulnerability feature vector. The vulnerability feature vectors with a threshold magnitude gradient and/or a subset of highest magnitude gradients of a set of gradients can be utilized as the basis for the mitigation steps 136. In other words, vulnerability features having a largest impact (larger magnitude gradient) on damage/no-damage and/or degree of damage outcome can be a focus of mitigation steps because they can affect the damage propensity score 140 more than vulnerability features having a small impact (smaller magnitude gradient) on outcome. For example, roof construction material can be selected as a mitigation step if the gradient of the damage propensity score 140 with respect to a vulnerability feature vector for roof construction material is at least a threshold magnitude or is top-ranked amongst the gradients for the vulnerability feature vectors for the parcel.

In some embodiments, a neural network can be utilized to infer vulnerability features within imaging data which may have a greatest impact to the damage propensity score 140 determined by damage propensity model 106.

In some embodiments, the graphical user interface of the application environment 130 can present visual representations of the mitigation steps 136 on the user device 128. For example, a visual indicator 138 can identify a mitigation step, e.g., indicating to remove vegetation from the parcel. Visual indicator 138 can be a bounding box surrounding the identified mitigation step 136, a graphical arrow or other indicator, or the like. Visual indicator 138 can include text-based information about the mitigation step 136, e.g., explaining how and why the mitigation step 136 reduces the damage propensity score 140 of the parcel.

In some embodiments, the system 102 can perform an optimization process by iterating suggested characteristics to vulnerability features of the parcel and calculating updated propensity scores 140, until an optimized, e.g., lowest, damage propensity score is found. An optimization process can continue until a threshold damage propensity score is met.

In some embodiments, the hazard vulnerability system 102 can additionally incorporate cost-analysis for the mitigation steps 136. In other words, the hazard vulnerability system 102 can determine mitigation steps 136 that balance optimization of the damage propensity score 140 while also maintaining cost of the mitigation steps 136 below a threshold cost.

In some embodiments, the hazard vulnerability system 102 can determine one or more mitigation steps based on a particular type of hazard event, e.g., flood vs wildfire, where the mitigation steps for a first type of hazard event is different than mitigation steps for a second type of hazard event. For example, a mitigation step responsive to a flood hazard can include digging a run-off trench and updating gutter systems, whereas a mitigation step responsive to wildfire can include trimming back vegetation surrounding the home.

In some embodiments, the hazard vulnerability system 102 receives a request 126 for a real-time damage propensity score 140 responsive to a real-time hazard event. The hazard vulnerability system 102 can receive real-time event data 142 for the hazard event and determine from the characteristics of the vulnerability features and the real-time event data, a propensity score for the parcel that is responsive to the hazard event. The hazard vulnerability system 102 can re-evaluate propensity score 140 in real-time based in part on updated hazard event data for the hazard event, e.g., change in weather conditions, containment, etc., and provide to the user the updated propensity score 140 in response to the updated hazard event data.

In some embodiments, mitigation engine 108 receives real-time event data 142. Real-time event data can be utilized to provide real-time mitigation steps 136 to a user via the user device 128 to reduce a parcel damage score 140 responsive to an on-going hazard event. For example, real-time event data including wildfire spread and containment, weather patterns, and emergency responder alerts can be utilized to help a homeowner to take immediate steps to combat wildfire spread and reduce propensity of their property to be damaged by the wildfire.

Figure 4:
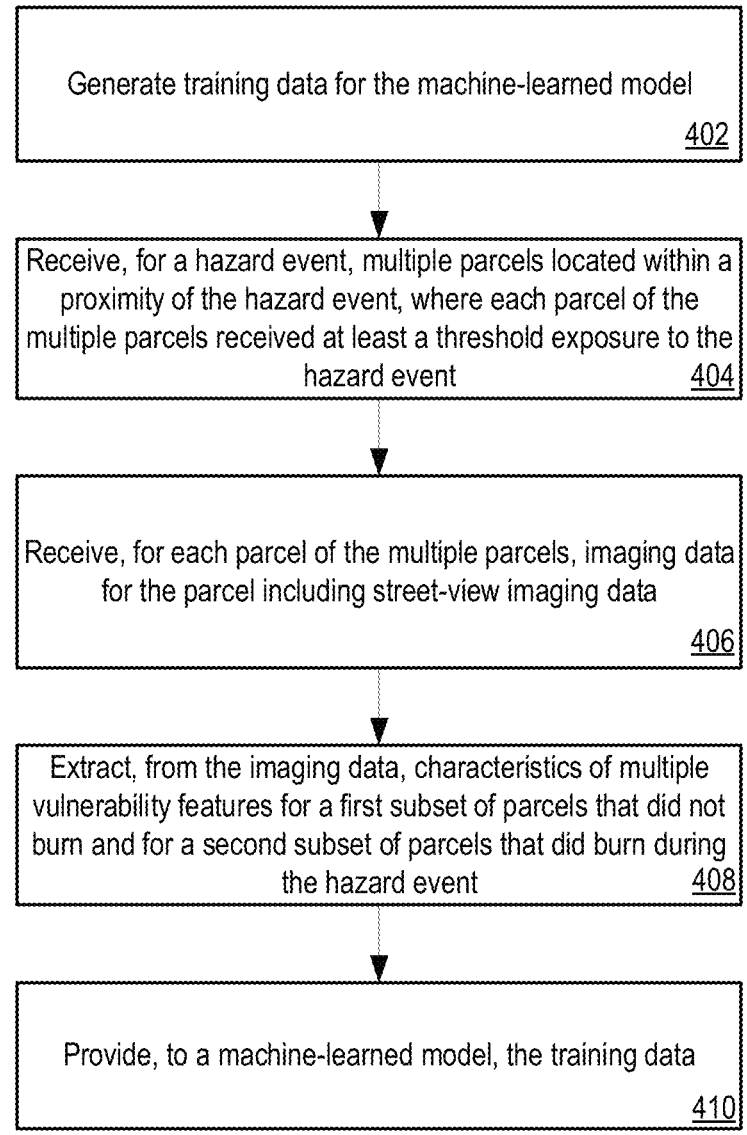
FIG. 4 is a flow diagram of another example process of the hazard vulnerability system.

FIG. 4 is a flow diagram of another example process of the hazard vulnerability system. The hazard vulnerability hazard vulnerability system 102 generates training data for the machine-learned model (402). Training the machine-learned model, e.g., the damage propensity model 106, includes generating training data 120 including a large sample set of imaging data 116 and historical hazard event data 124 including parcel data 122, e.g., several thousand images for hundreds of hazard events. The generated training data can be representative of various imaging conditions, e.g., weather conditions, lighting conditions, seasons, etc., and for various hazard events, e.g., differing scales of hazard, spread, location of hazard, types of hazards, to generalize the damage propensity model 106 trained on the training data 120 to develop heuristics for a wide range of imaging conditions and hazard events.

The system receives, for a hazard event, multiple parcels located within a proximity of the hazard event, where each parcel of the multiple parcels received at least a threshold exposure to the hazard event (404). The system can receive historical hazard event data 124 for the hazard event which can include parcel data 122 for each parcel of the multiple parcels that were located within the proximity of the hazard event, e.g., within a burn radius 208.

Proximity to the hazard event can be defined as being located within a burn radius 208 surrounding a burn scar 206. As depicted in the FIG. 2A, a burn radius 208 can define an extended area surrounding a burn scar 206. In some embodiments, proximity to the hazard event can be a threshold distance from the outer perimeter of the burn scar 206, e.g., within a mile, within 100 feet, within 5 miles, etc.

A threshold exposure is a minimum amount of exposure to the hazard event by the parcel and can be defined, for example, by the proximity of the parcel to the hazard event, by an amount of time the parcel was actively exposed to the hazard event, e.g., amount of time a property was actively exposed to the wildfire, or the like. In some embodiments, threshold exposure can be defined using emergency responder metrics, e.g., considered high-risk or evacuation zone by emergency responders. In one example, a parcel can meet a threshold exposure by being considered within an evacuation zone for a wildfire. In another example, a parcel can meet a threshold exposure by having flood waters (or wildfire, or tornado, or earthquake, etc.) coming into contact with at least a portion of the parcel. In another example, a parcel can meet a threshold exposure by being located within or within a threshold proximity of a burn scar.

In some embodiments, each parcel of multiple parcels located within a burn scar can be considered to have received a threshold amount of exposure.

In some embodiments, a fire radiative power (FRP) of a fire can be calculated from mapped remote-sensing derived measurements of fire intensity. For example, using satellite data of an active fire, any structures within a certain region and with a given threshold FRP value can be counted as experiencing a same threshold amount of exposure.

The system receives, for each parcel of the multiple parcels located within the proximity of the hazard event, imaging data for the parcel including street-view imaging data (406). Imaging data 116 can include satellite/aerial images 118, and street-view images 117, collected by the hazard vulnerability system 102 from a repository of collected images, e.g., located in various databases and sources. Each image of the imaging data 116 includes a capture time when the image was captured and includes a geographic region including the parcel of the multiple parcels. Satellite/aerial images 118 include a geographic region captured at a particular resolution and includes location information, e.g., GPS coordinates, defining the geographic region captured within the frame of the image. Street-view images 117 include a street-level view of one or more parcels, e.g., one parcel, two parcels, etc., of the multiple parcels captured at a particular resolution and includes location information, e.g., street address, defining a location of the parcels captured in the street-view image 117.

The system extracts, from the imaging data, characteristics of multiple vulnerability features for a first subset of parcels that did not burn and a second subset of parcels that did burn during the hazard event (408). As described with reference to FIGS. 1, 2A-C, the vulnerability feature exactor 110 can receive imaging data 116 and extract, using multiple classifiers, vulnerability features. In some embodiments, extracting characteristics of vulnerability features by the multiple classifiers includes identifying, by the multiple classifiers, objects in the imaging data 116.

In some embodiments, the system can receive parcel data 122 for the first subset of parcels that did not burn and for the second subset of parcels that did burn during the hazard event. Parcel data 122 can include additional structural characteristics, e.g., post-hazard event inspections, building/construction records, appraisals, insurance assessments, etc., about each of the parcels. The system can extract, from the additional structural data, vulnerability features and characteristics of the vulnerability features for the first subset of parcels that did not burn and the second subset of parcels that did burn.

The system can generate, from the extracted vulnerability features and characteristics for the vulnerability features, training vectors. In some embodiments, vector generator module 114 generates training vectors from the extracted vulnerability features and characteristics of the vulnerability features for the machine-learned model.

The system 102 can generate training data 120 using the extracted vulnerability features and characteristics of the vulnerability features for each parcel of multiple parcels and for a particular hazard event. Damage/no-damage records and/or degree of damage records to particular parcels of the multiple parcels from historical hazard event data 124 can be utilized as ground truth for the burn/no burn outcome for each parcel.

The system provides the training data to a machine-learned model (410). The training data 120 is provided to a machine-learned model, e.g., the damage propensity model 106 to train the damage propensity model 106 to make inferences about damage propensity for a particular parcel for a general hazard event type or a particular hazard event.

Figure 5:
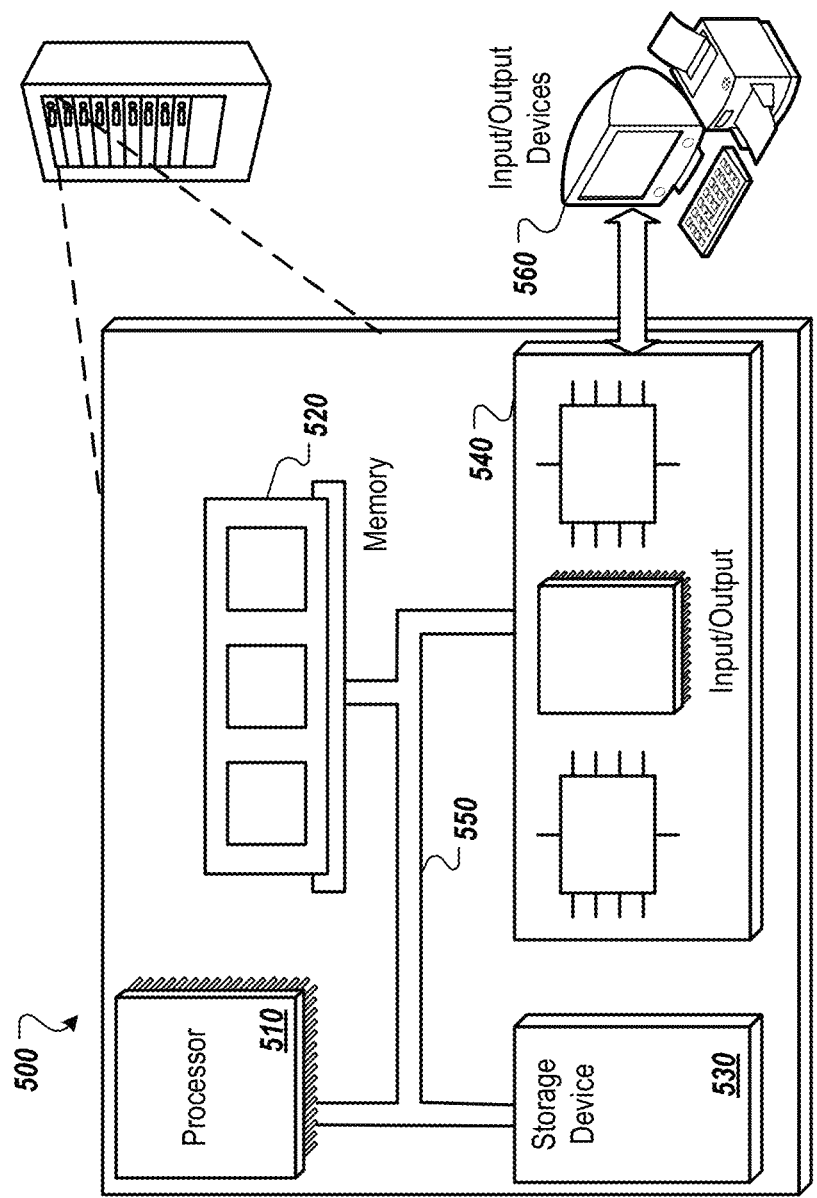
FIG. 5 is a block diagram of an example computer system.

FIG. 5 is a block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, a storage device that is shared over a network by multiple computing devices (for example, a cloud storage device), or some other large capacity storage device.

The input/output device 540 provides input/output operations for the system 500. In one implementation, the input/output device 540 can include one or more network interface devices, for example, an Ethernet card, a serial communication device, for example, a RS-232 port, and/or a wireless interface device, for example, a 502.11 card. In another implementation, the input/output device can include driver devices configured to receive input data and send output data to other input/output devices, for example, keyboard, printer and display devices 560. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, that is, one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, for example, a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, for example, an FPGA (field programmable gate array) or an ASIC (application-specific integrated circuit). The apparatus can optionally include, in addition to hardware, code that creates an execution environment for computer programs, for example, code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, for example, an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a Global Positioning System (GPS) receiver, or a portable storage device, for example, a universal serial bus (USB) flash drive, to name just a few.

Computer-readable media suitable for storing computer program instructions and data include all forms of nonvolatile memory, media and memory devices, including by way of example semiconductor memory devices, for example, EPROM, EEPROM, and flash memory devices; magnetic disks, for example, internal hard disks or removable disks; magneto-optical disks; and CD-ROM and DVD-ROM disks.

To provide for interaction with a user, embodiments of the subject matter described in this specification can be implemented on a computer having a display device, for example, a CRT (cathode ray tube) or LCD (liquid crystal display) monitor, for displaying information to the user and a keyboard and a pointing device, for example, a mouse or a trackball, by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of messages to a personal device, for example, a smartphone that is running a messaging application and receiving responsive messages from the user in return.

Data processing apparatus for implementing machine learning models can also include, for example, special-purpose hardware accelerator units for processing common and compute-intensive parts of machine learning training or production, that is, inference, workloads.

Machine learning models can be implemented and deployed using a machine learning framework, for example, a TensorFlow framework, a Microsoft Cognitive Toolkit framework, an Apache Singa framework, or an Apache MXNet framework.

Embodiments of the subject matter described in this specification can be implemented in a computing system that includes a back-end component, for example, as a data server, or that includes a middleware component, for example, an application server, or that includes a front-end component, for example, a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, for example, a communication network. Examples of communication networks include a local area network (LAN) and a wide area network (WAN), for example, the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, for example, an HTML page, to a user device, for example, for purposes of displaying data to and receiving user input from a user interacting with the device, which acts as a client. Data generated at the user device, for example, a result of the user interaction, can be received at the server from the device.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
    receiving a request for a damage propensity score for a parcel for one or more hazard event scenarios;
    receiving imaging data for the parcel, the imaging data capturing an aspect of the parcel;
    extracting, by a trained machine-learned model comprising a plurality of classifiers, characteristics of a plurality of vulnerability features for the parcel from the imaging data;
    determining, by the trained machine-learned model and from the characteristics of the plurality of vulnerability features, the damage propensity score for the parcel for the one or more hazard event scenarios;
    determining, by the trained machine-learned model and from the characteristics of the plurality of vulnerability features for the parcel, a plurality of mitigation steps for reducing the damage propensity score for the one or more hazard event scenarios;
    selecting, by the trained machine-learned model and from the plurality of mitigation steps, a proposed subset of one or more mitigation steps, wherein the selecting comprises,
    for each subset of one or more mitigation steps:
        determining, by the trained machine-learned model and based on the selected subset of one or more mitigation steps, a corresponding updated damage propensity score; and
        selecting the proposed subset of one or more mitigation steps, wherein the proposed subset of one or more mitigation steps corresponds to the updated damage propensity score yielding a target reduction in the damage propensity score for the one or more hazard event scenarios; and
    providing a representation of the subset of one or more proposed mitigation steps and the corresponding updated damage propensity score for display.

2. The computer-implemented method of claim 1, wherein the imaging data comprises street-view imaging data of the parcel.

3. The computer-implemented method of claim 2, wherein the imaging data further comprises one or more of LIDAR data, high-resolution satellite image data, aerial image data, infrared image data, and user-provided images.

4. The computer-implemented method of claim 1, wherein the target reduction comprises a largest reduction between the updated damage propensity score and the damage propensity score for the subsets of one or more mitigation steps.

5. The computer-implemented method of claim 1, wherein selecting the proposed subset of one or more mitigation steps comprises selecting the proposed subset of one or more mitigation steps based in part on a cost of implementing the proposed subset of one or more mitigation steps and a resulting reduction of the updated damage propensity score from the damage propensity score.

6. The computer-implemented method of claim 1, wherein a first proposed subset of one or more mitigation steps for a first hazard scenario is different than a second subset proposed of one or more mitigation steps for a second hazard scenario.

7. The computer-implemented method of claim 1, wherein extracting the plurality of mitigation steps comprises:
    identifying, by the trained machine-learned model, adjustments to the characteristics of the plurality of vulnerability features extracted from the imaging data, and
    wherein determining the updated damage propensity score comprises determining the updated damage propensity score based on the adjustments to the characteristics of the plurality of vulnerability features.

8. The computer-implemented method of claim 1, further comprising:
    selecting, for each of at least two hazard event scenarios, a corresponding proposed subset of one or more mitigation steps for each of the at least two hazard event scenarios; and
    providing a representation of the corresponding proposed subsets for each of the at least two hazard event scenarios for display.

9. The computer-implemented method of claim 1, wherein selecting each subset of one or more mitigation steps from the plurality of mitigation steps comprises:
    selecting at least two different subsets of one or more mitigation steps from the plurality of mitigation steps.

10. A non-transitory computer storage medium encoded with a computer program, the computer program comprising instructions that when executed by a data processing apparatus cause the data processing apparatus to perform operations comprising:
    receiving a request for a damage propensity score for a parcel for one or more hazard event scenarios;
    receiving imaging data for the parcel, wherein the imaging data comprises an aspect of the parcel;
    extracting, by a trained machine-learned model comprising a plurality of classifiers, characteristics of a plurality of vulnerability features for the parcel from the imaging data;
    determining, by the trained machine-learned model and from the characteristics of the plurality of vulnerability features, the damage propensity score for the parcel for the one or more hazard event scenarios;
    determining, by the trained machine-learned model and from the characteristics of the plurality of vulnerability features for the parcel, a plurality of mitigation steps for reducing the damage propensity score for the one or more hazard event scenarios;
    selecting, by the trained machine-learned model and from the plurality of mitigation steps, a proposed subset of one or more mitigation steps, wherein the selecting comprises,
    for each subset of one or more mitigation steps:
        determining, by the trained machine-learned model and based on the selected subset of one or more mitigation steps, a corresponding updated damage propensity score; and
        selecting the proposed subset of one or more mitigation steps, wherein the proposed subset of one or more mitigation steps corresponds to the updated damage propensity score yielding a target reduction in the damage propensity score for the one or more hazard event scenarios; and providing a representation of the subset of one or more proposed mitigation steps and the corresponding updated damage propensity score for display.

11. The non-transitory computer storage medium of claim 10, wherein the target reduction comprises a largest reduction between the updated damage propensity score and the damage propensity score for the subsets of one or more mitigation steps.

12. The non-transitory computer storage medium of claim 10, wherein selecting the proposed subset of one or more mitigation steps comprises selecting the proposed subset of one or more mitigation steps based in part on a cost of implementing the proposed subset of one or more mitigation steps and a resulting reduction of the updated damage propensity score from the damage propensity score.

13. The non-transitory computer storage medium of claim 10, wherein a first proposed subset of one or more mitigation steps for a first hazard scenario is different than a second subset proposed of one or more mitigation steps for a second hazard scenario.

14. The non-transitory computer storage medium of claim 10, wherein extracting the plurality of mitigation steps comprises:

identifying, by the trained machine-learned model, adjustments to the characteristics of the plurality of vulnerability features extracted from the imaging data, and wherein determining the updated damage propensity score comprises determining the updated damage propensity score based on the adjustments to the characteristics of the plurality of vulnerability features.

15. The non-transitory computer storage medium of claim 10, further comprising:

selecting, for each of at least two hazard event scenarios, a corresponding proposed subset of one or more mitigation steps for each of the at least two hazard event scenarios; and providing a representation of the corresponding proposed subsets for each of the at least two hazard event scenarios for display.

16. The non-transitory computer storage medium of claim 10, wherein selecting each subset of one or more mitigation steps from the plurality of mitigation steps comprises:

selecting at least two different subsets of one or more mitigation steps from the plurality of mitigation steps.

17. A system comprising:
a user device; and
one or more computers operable to interact with the user device and to perform operations comprising:

receiving a request for a damage propensity score for a parcel for one or more hazard event scenarios;

receiving imaging data for the parcel, wherein the imaging data comprises an aspect of the parcel;

extracting, by a trained machine-learned model comprising a plurality of classifiers, characteristics of a plurality of vulnerability features for the parcel from the imaging data;

determining, by the trained machine-learned model and from the characteristics of the plurality of vulnerability features, the damage propensity score for the parcel for the one or more hazard event scenarios;

determining, by the trained machine-learned model and from the characteristics of the plurality of vulnerability features for the parcel, a plurality of mitigation steps for reducing the damage propensity score for the one or more hazard event scenarios;

selecting, by the trained machine-learned model and from the plurality of mitigation steps, a proposed subset of one or more mitigation steps, wherein the selecting comprises, for each subset of one or more mitigation steps:

determining, by the trained machine-learned model and based on the selected subset of one or more mitigation steps, a corresponding updated damage propensity score; and selecting the proposed subset of one or more mitigation steps, wherein the proposed subset of one or more mitigation steps corresponds to the updated damage propensity score yielding a target reduction in the damage propensity score for the one or more hazard event scenarios; and providing a representation of the subset of one or more proposed mitigation steps and the corresponding updated damage propensity score for display.

18. The system of claim 17, wherein the target reduction comprises a largest reduction between the updated damage propensity score and the damage propensity score for the subsets of one or more mitigation steps.

19. The system of claim 17, wherein selecting the proposed subset of one or more mitigation steps comprises selecting the proposed subset of one or more mitigation steps based in part on a cost of implementing the proposed subset of one or more mitigation steps and a resulting reduction of the updated damage propensity score from the damage propensity score.

* * * * *